July 11, 1967     K. BLACKBURN ET AL     3,330,432

PALLET TRANSPORTER

Filed June 23, 1965

Inventors
Keith Blackburn
David L. Spanjer
By Cushman, Darby & Cushman
Attorneys July 11, 1967   K. BLACKBURN ET AL   3,330,432
PALLET TRANSPORTER Filed June 23, 1965   6 Sheets-Sheet 3

Inventors
Keith Blackburn
David L. Spanjer
By Cushman, Darby & Cushman
Attorneys July 11, 1967 K. BLACKBURN ETAL 3,330,432
PALLET TRANSPORTER Filed June 23, 1965 6 Sheets-Sheet 4

Inventors
Keith Blackburn
David L. Spanjer
By Cushman, Darby & Cushman
Attorneys July 11, 1967    K. BLACKBURN ETAL    3,330,432
PALLET TRANSPORTER Filed June 23, 1965    6 Sheets-Sheet 5

Inventors
Keith Blackburn
David L. Spanjer
By Cushman, Darby & Cushman
Attorneys July 11, 1967   K. BLACKBURN ET AL   3,330,432
PALLET TRANSPORTER Filed June 23, 1965                                   6 Sheets-Sheet 6

Inventors
Keith Blackburn
David L. Spanjer
By Cushman, Darby & Cushman
Attorneys

United States Patent Office 3,330,432
Patented July 11, 1967

3,330,432
PALLET TRANSPORTER
Keith Blackburn, Enumclaw, Wash., and David Lucien Spanjer, Fort William, Ontario, Canada, assignors to Hawker Siddeley Canada Ltd., Fort William, Ontario, Canada
Filed June 23, 1965, Ser. No. 466,329
Claims priority, application Canada, June 26, 1964, 905,981
2 Claims. (Cl. 214—505)

This invention relates to a new and improved pallet transporting device and, more particularly, to a pallet transporter which may be mechanically loaded and unloaded without the need for separate handling of the transported goods.

In the transporting of material supported by a pallet it is common practice to move the goods from one point to another and then employ manual labour or a winch at the unloading site to unload the goods, remove the pallet from the vehicle and then load the goods back onto the pallet. Following this operation the transporting vehicle is driven to other points for different duties. This arrangement has several disadvantages, one of them being that the transported items must be firmly secured to the vehicle, particularly if a traverse is to be made over rough terrain. A securing and unsecuring step involves a waste of time by personnel besides tying up a piece of equipment which is generally quite expensive. Even in the case where a winch is employed to load and unload items from a pallet transporter, a problem is presented simply because the items must be deposited directly on the ground and in some instances this can be quite difficult because of rough terrain, besides poor ground caused by mud, freezing conditions, water, etc.

In certain situations, it may be desirable or even necessary to transport an extremely heavy load over snow or ice and if the capacity of the transporting vehicle is not sufficiently great, several trips may be necessary. Ideally, under these circumstances it would be desirable to have a multipurpose transporter which could drag a heavy load along the snow and thereby obviate the necessity for a larger scale vehicle to bear the entire load. It is also obvious that transporting a load over a frozen body of water by towing, is much safer than if the load were to be carried by a single vehicle where the weight of the load, concentrated in a relatively small area, could cause the vehicle and load to break through the ice.

Generally, when operating over rough terrain, it is highly desirable that the minimum number of transport vehicles be employed and that goods and materials be shifted around as quickly and as expediously as possible. Also, a vehicle employed for pallet transportation should have a multipurpose capacity so that if pallet transportation is not called for, the transporter may be employed for other uses.

It is an object of this invention to provide a transport vehicle adapted to move loaded pallets, while still being capable of functioning in other capacities when not required for an actual pallet shipment.

Other objects of this invention will become more apparent from the description to follow.

The objects of this invention are contained in a motorised pallet transporter comprising, in combination, an inclinable platform mounted at one end of said vehicle, said platform adapted to engage, load and support a loaded pallet and to slide said pallet onto the ground from the inclined position.

The invention will be more readily understood from the diagrams in which.

Figure 1:
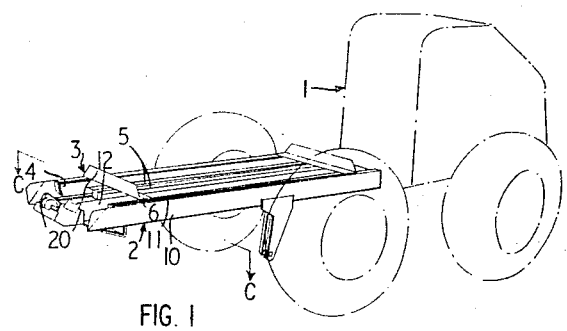
FIG. 1 illustrates a perspective view of a platform bearing a pallet and being supported at the end of a vehicle.
Figure 2:
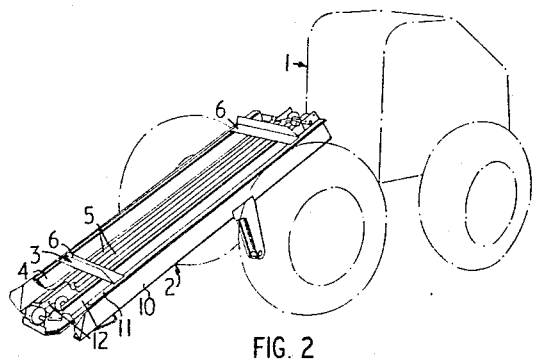
FIG. 2 represents a perspective view of the platform in a downwardly inclined position.
Figure 3:
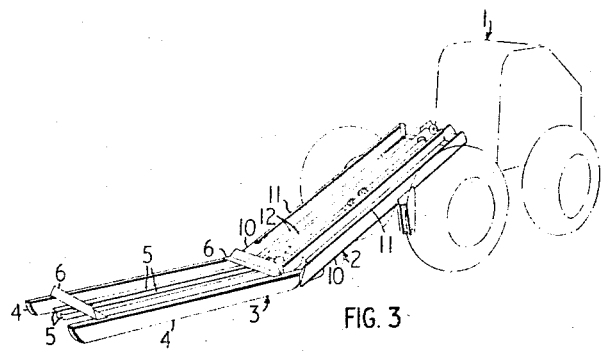
FIG. 3 represents a perspective view of a loaded pallet as it is being released from the platform.
Figure 4:
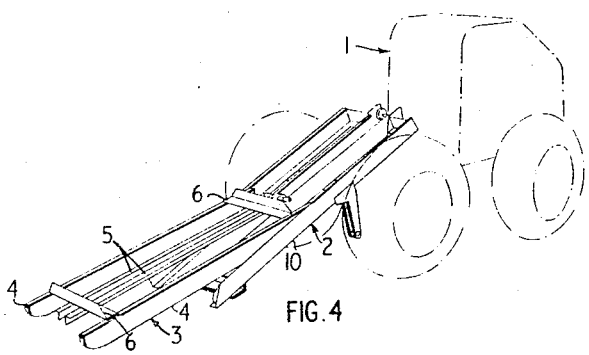
FIG. 4 represents a perspective view of the pallet having been completely unloaded from the platform.
Figure 5:
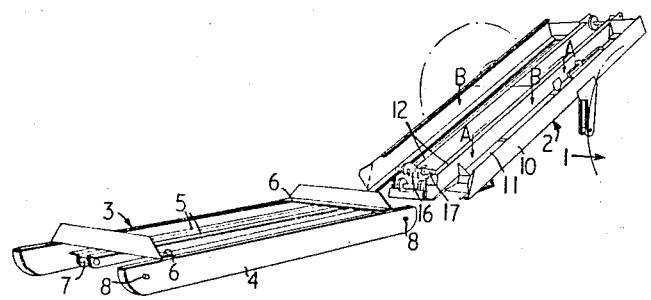
FIG. 5 represents a perspective view of the pallet unloaded and disconnected from the platform.
Figure 9:
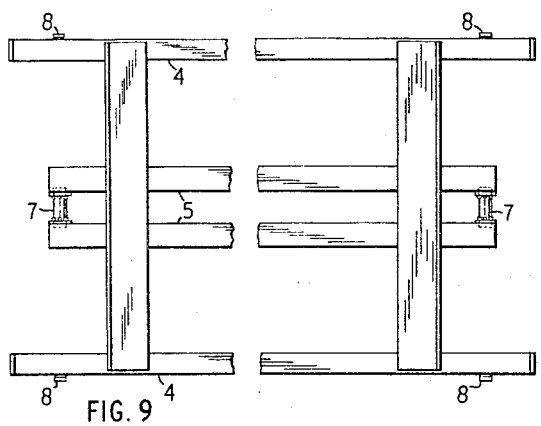
FIG. 9 represents a plan view of the platform.
Figure 11:
FIG. 11 represents a side elevation of the pallet.
Figure 10:
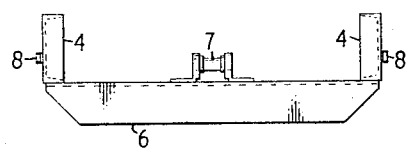
FIG. 10 represents an end elevation of the pallet.
Figure 12:
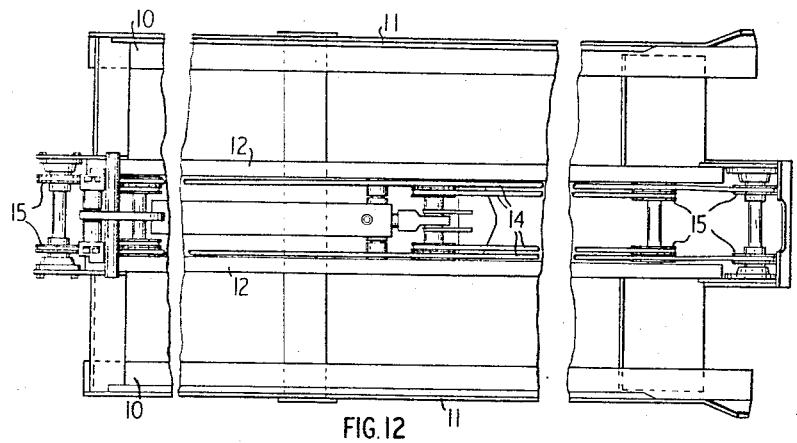
FIG. 12 represents a plan view of the platform.

The pallet loading device according to this invention is shown with a motorised vehicle 1 in dotted designation, having a pallet supporting platform 2 mounted at the rear of the vehicle and positioned between the rear end wheels. An unloaded pallet 3 is positioned on the platform, the load being omitted for better illustration. FIG. 1 shows the platform and pallet in the horizontal position used during the course of transporting a load and when the vehicle is stationary. The pallet itself is shown in more detail in FIGS. 9, 10 and 11 and comprises skids 4 at the outer side of the pallet, central bars 5, for supporting a load, and end transverse connecting bars 6. Hook engaging bars 7 are mounted at both ends of the pallet between the central bars 5, although only one at a time is used. The transverse bars may be provided with an upraised member to assist in retaining a load on the pallet and prevent it from shifting either forwards or backwards, and if desired similar member may be provided along the tops of the skid portion to prevent a sideways movement of the load. A plurality of buttons 8 are mounted on the pallet to frictionally engage the platform if it is desired to prevent unnecessary rocking or other movement during transportation. The materials of construction for the pallet will vary depending on such factors as weight capacity, durability, resistance to corrosion, presence of water, etc.

The platform 2 comprises a base member 9 and supporting side members 10, the upper portion of the side member having positioned thereon a safety rail 11. The latter is designed to retain the pallet within the cradle when traversing extremely rough terrain or side hill operation. The steel buttons 8 are designed to prevent the pallet from moving upward beyond the safety rail and either bouncing or tipping out. Positioned medially of the platform are two rails 12 for guiding a hook carrier 22 and hook lift bar. Together with the in-turned base portion of the side member 10 for engaging the skids 4 of the pallet, this will constitute the support on the platform for the pallet.

Figure 6:
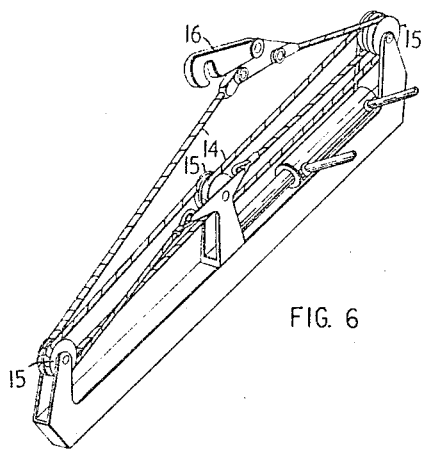
FIG. 6 is a perspective view of the cable-hauling system mounted on the platform.
Figure 6A:
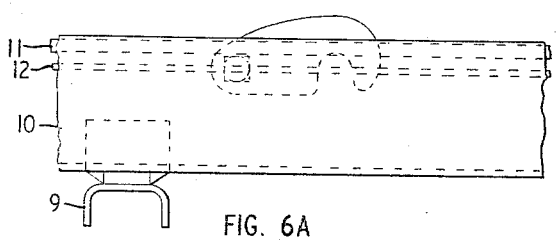
FIG. 6a represents a sectional elevation of the platform end taken along line A—A of FIG. 5.
Figure 7:
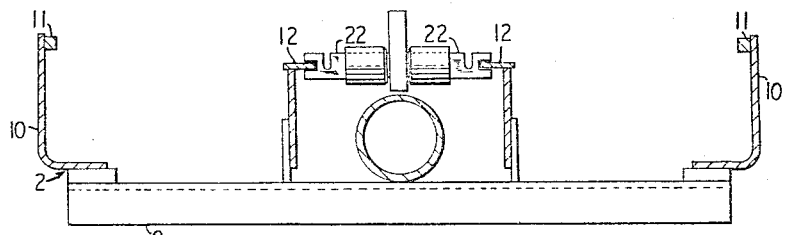
FIG. 7 represents a sectional elevation of the platform taken along line B—B of FIG. 5.
Figure 8:
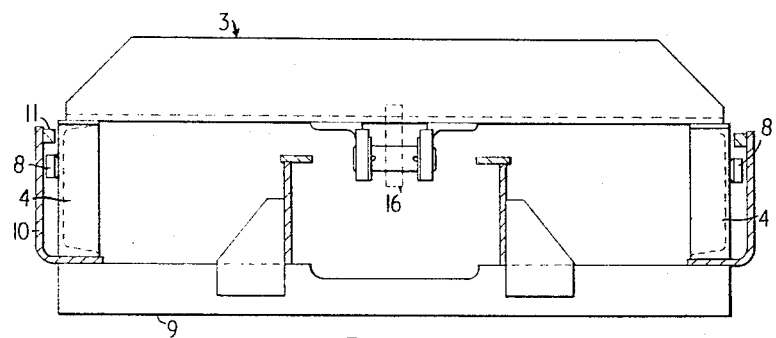
FIG. 8 represents a sectional elevation of the platform with the pallet in position and is taken along line C—C of FIG. 1.

Positioned beween and supported by the guide rails is a cable hauling system for hauling the pallet up and down the platform. A set of cables 14 are wound around the winch and drawn around pulleys 15, the pulleys being positioned at both ends of the platform. The cable ends are attached to the hook carrier 22. In actual practice two sets of cables are used to provide balanced hauling forces. The cable system diagrammatically shown in FIG. 6 is operated by a standard hydraulic cylinder powered from the vehicle, and powers a hook 16 centrally positioned between the platform guide rails 12 and rotatable about a bar 17. This bar is attached at both of its ends to each set of cables by connecting grips 18. The cable arrangement is such that a positive force is applied to the hook for either the loading or unloading operations. This is a distinct improvement over present systems where the only positive force applied is when hauling the pallet onto the platform.

Positioned medially along the hook is a hook lift bar 19 which is adapted to ride on its ends 19a along the guide rails 12 of the platform. At the unloading end of the platform, raised portions 20 are provided on each guide rail so that when the hook lift bar comes to the end of the rails it will ride up along these raised portions and elevate the hook from its otherwise horizontal position.

Figure 13:
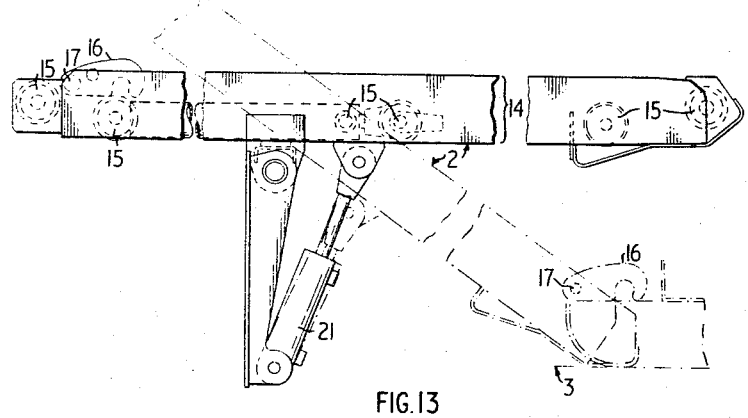
FIG. 13 is a sectional side elevation of the platform in the horizontal position showing the hydraulic actuating cylinder for tilting the platform and the cylinder for driving the pick-up winch.
Figure 14:
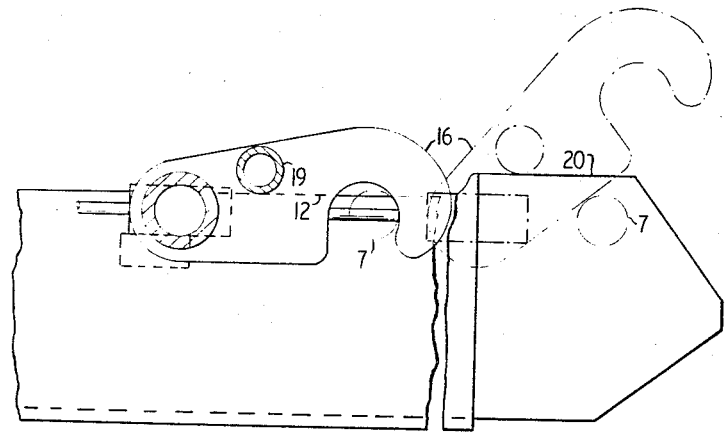
FIG. 14 represents the pick-up hook in pick-up position.

Assuming a pallet is resting on the ground and ready for loading onto the platform the sequence of operation is as follows: the transport vehicle is backed up into approximate alignment with the pallet, and the platform is then tilted by hydraulic tilt cylinder 21 from its normally horizontal elevation (FIG. 13) to an inclined position (FIG. 13 dotted); the cable hydraulic system is then actuated drawing the hook lift bar 19 to the end of the rails 12 and onto raised portions 20 so as to elevate the hook; the vehicle is then backed up and aligned to a position where the now elevated hook overhangs the hook engaging bar 7 of the pallet; the hook lift bar 19 is then withdrawn slightly along the guide rails till it is no longer resting on the raised portion 20. Consequently the hook lift bar 19 will lower the hook from its elevated position into engaging contact with the engaging bar 7; the engaged pallet is then simply drawn up the inclined platform until pallet skids 4 are completely supported by the inward portions of the side members 10; the platform is then elevated to the horizontal position by the hydraulic tilt cylinders and the vehicle driven away with the loaded pallet.

It will be observed that at no time is the operator required to leave the cab or handle the load and this saves personnel time and because of this decreased handling time, the vehicle is freed for use in other locations.

The transporting vehicle need not be employed solely for material handling operations requiring a pallet. If desired, the pallet may be used as a support for enclosures such as a privy, field office, etc., and for this purpose the platform is simply maintained in its horizontal position. If necessary, the enclosure can be unloaded to free the vehicle for further use.

In other situations, the vehicle may be employed to operate pumps, saws, drilling from the rear end portions, etc., and it will be appreciated these additional functions are made possible by simply adapting the hydraulic systems to a particular end use.

We claim:

1. A motorised pallet transporter comprising an inclinable platform mounted on said vehicle and having skid supporting members; guide rails positioned between said skid supports; a positively driven engaging means positioned medially of said platform and between said guide rails; and a pallet supportable by said skids, and adapted for engagement by said engaging means for loading and unloading from the platform, said driven engaging means being movable along the guide rails which are upwardly inclined at the ends at the unloading part of the platform for elevating the engaging means into and out of engagement with said pallet.

2. A motorised pallet transporter comprising an inclinable platform mounted on said vehicle and having skid supporting members; guide rails positioned between said skid supports; a positively driven engaging means positioned medially of said platform and movable between said guide rails; said engaging means comprising a hook rotatable about a bar, the ends of said bar being movable along said guide rails; a pallet supportable by said skids and a bar positioned at the end of said pallet for engagement with said hook for loading and unloading from the platform; the ends of said guide rails at the unloading part of the platform being upwardly inclined for elevating the said hook into and out of engagement with the engaging bar of the pallet.

References Cited

UNITED STATES PATENTS

| | | | |
|---|---|---|---|
| 1,426,116 | 8/1922 | Simons | 214—707 |
| 1,977,307 | 10/1934 | Hayssen. | |
| 3,077,278 | 2/1963 | Alexander | 214—517 |
| 3,214,044 | 10/1965 | Dempster et al. | 214—505 |

GERALD M. FORLENZA, *Primary Examiner.*

ALBERT J. MAKAY, *Examiner.*